Patented Mar. 9, 1954

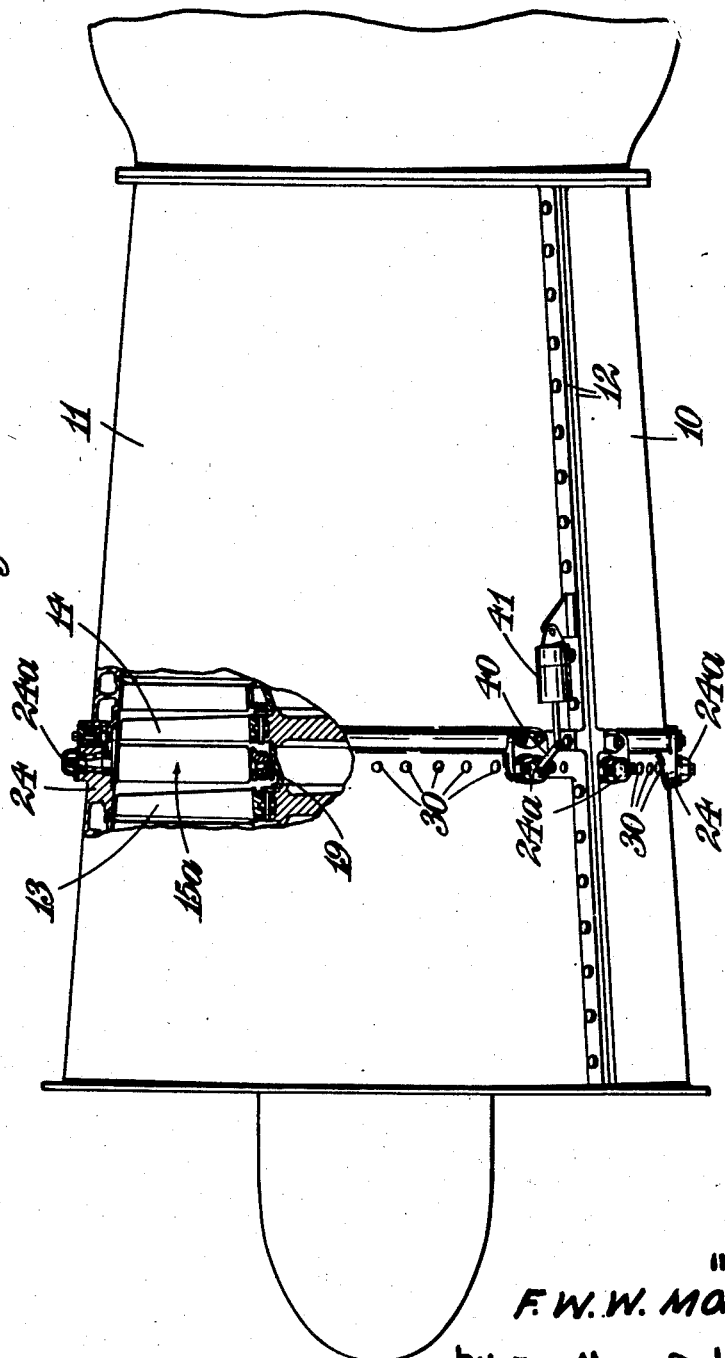

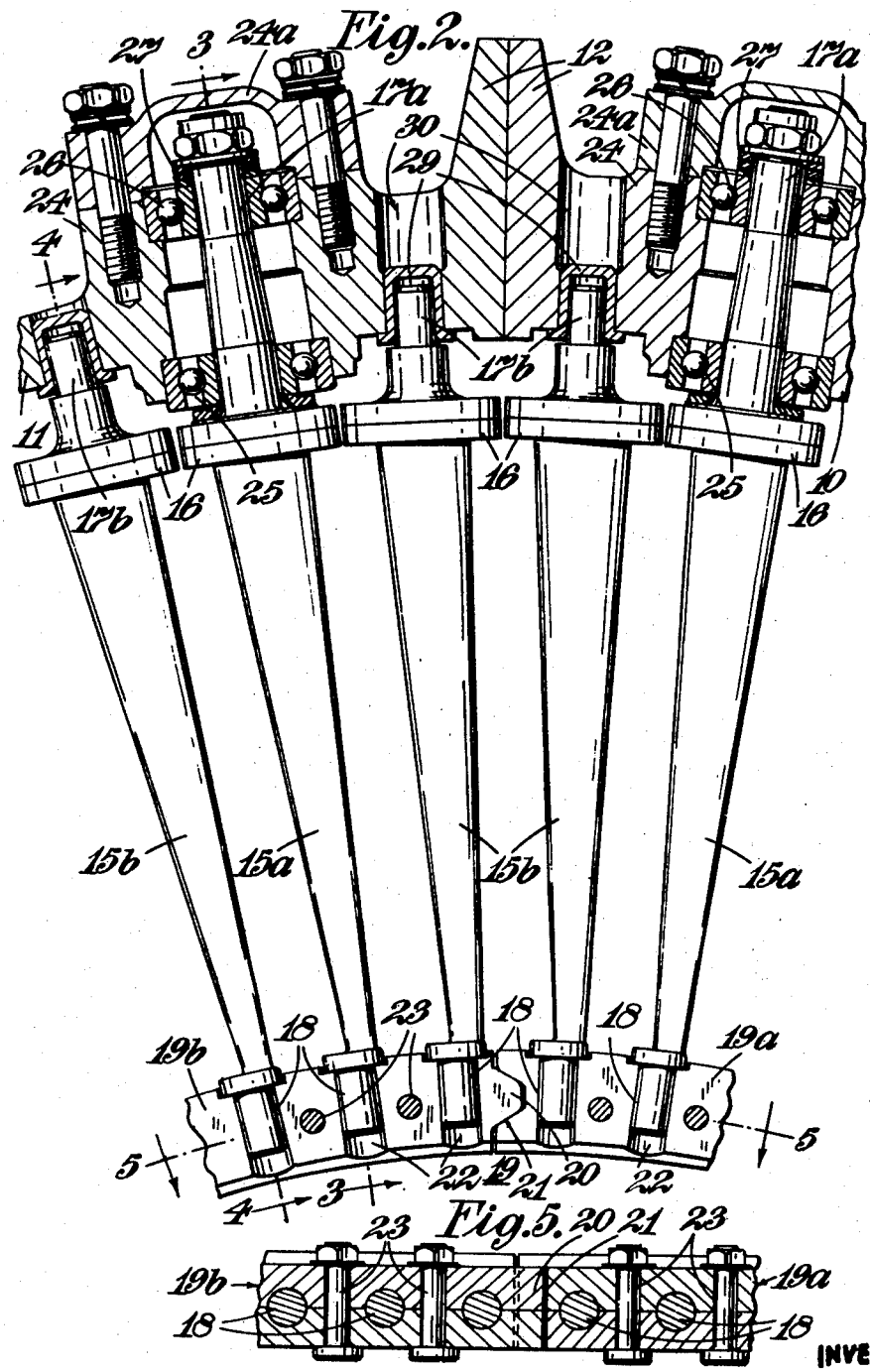

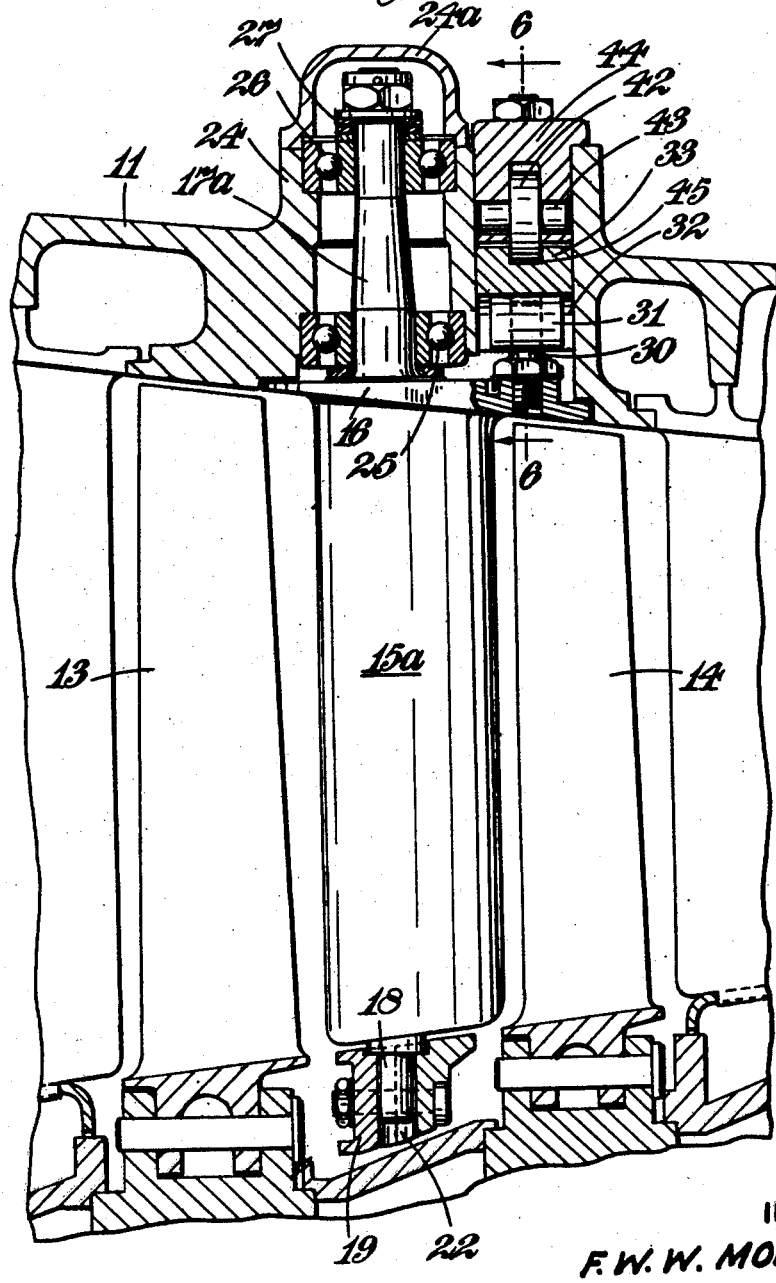

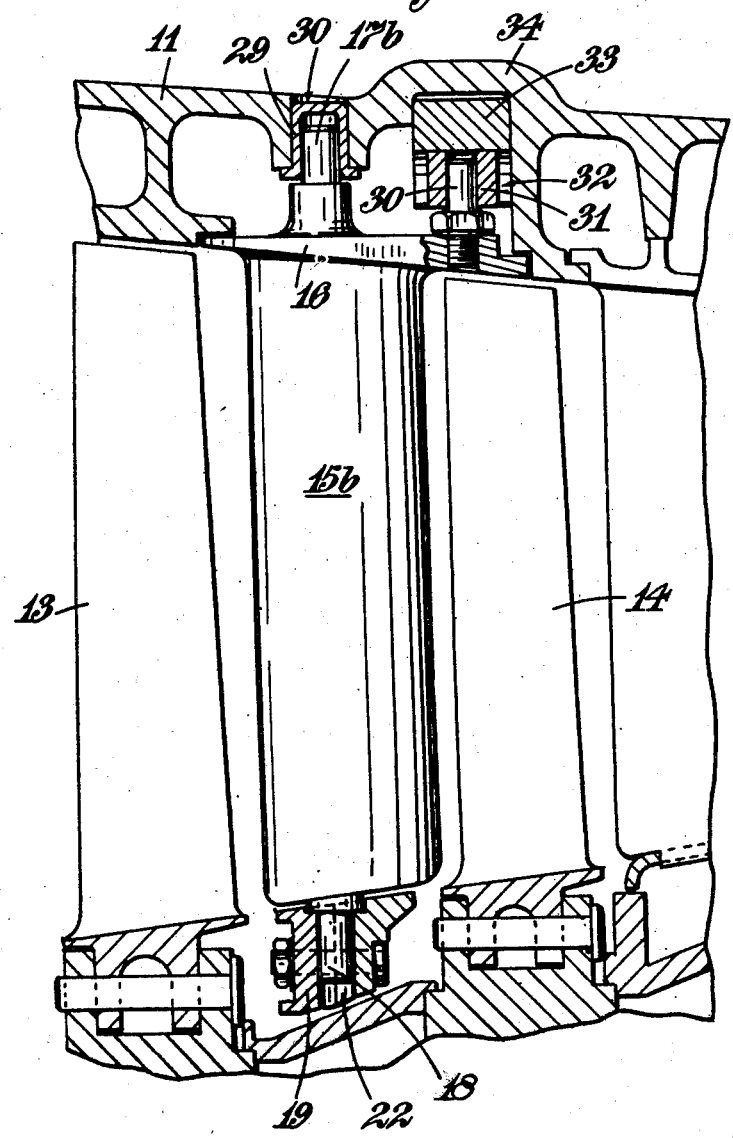

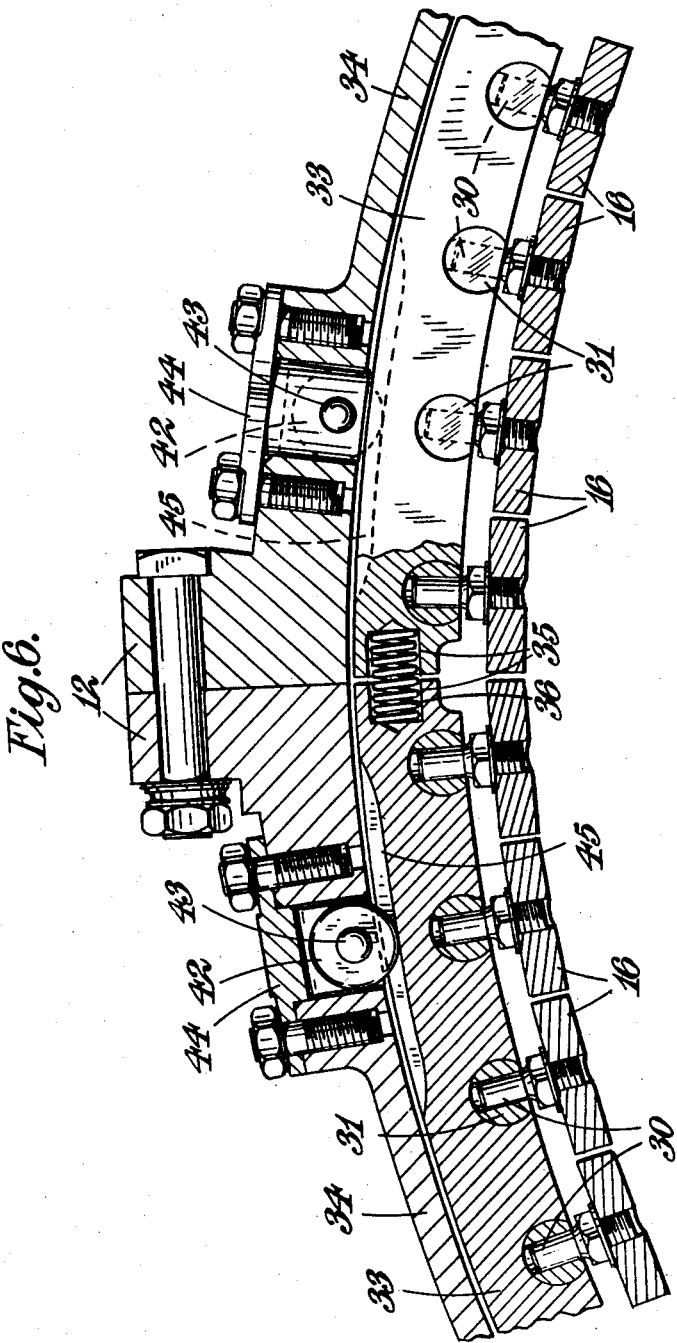

2,671,634

UNITED STATES PATENT OFFICE 2,671,634

ADJUSTABLE STATOR BLADE AND SHROUD RING ARRANGEMENT FOR AXIAL FLOW TURBINES AND COMPRESSORS

Frederick William Walton Morley, Aston-on-Trent, Derby, England, assignor to Rolls-Royce Limited, Derby, England, a British company Application June 30, 1950, Serial No. 171,344

Claims priority, application Great Britain July 1, 1949

8 Claims. (Cl. 253—69)

This invention relates to axial-flow turbines and compressors and is concerned with axial-flow turbines and compressors of the type (hereinafter referred to as axial-flow turbines or compressors of the type specified) comprising a ring of stator blades so mounted that their pitch is adjustable. Such an arrangement is described in the specification of U. S. Patent No. 2,613,029 (G. L. Wilde).

This invention has for an object to provide an improved construction of axial-flow turbine or compressor of the type specified in which the difficulties experienced in supporting the inner shroud of the adjustable blading, are avoided.

According to this invention, an axial-flow turbine or compressor of the type specified has some only of the blades of a ring of adjustable stator blades mounted in the outer casing of the compressor or turbine, each through an associated bearing arrangement having a substantial effective length axially of the blade, to extend inwardly from the outer casing and by their inner ends to support cantileverwise a shroud ring for the ring of blades, and has the remaining blades of the ring of blades engaged with the inner shroud ring and the outer casing through simple journal bearings which provide no substantial support for the inner shroud ring. For example, in a construction having a ring of, say, 67 adjustable stator blades, 8 of these blades may be arranged to carry the inner shroud ring cantileverwise from the outer casing and the remaining 59 blades may have short spindles engaged in simple cylindrical bushes or bearing sockets in the outer casing and inner shroud ring.

According to a feature of this invention, a bearing arrangement for the inner shroud ring supporting blades may comprise ball thrust bearings spaced apart in a direction lengthwise of the blade. The thrust bearings locate the supporting blades radially within the outer casing and the inner ends of the supporting blades consequently locate the inner shroud ring centrally within the outer casing.

According to another feature of this invention, in a construction of turbine or compressor whereof the casing is formed in a number of parts, say two semi-cylindrical or the like parts, the inner shroud ring is formed in a corresponding number of part-circular portions which are mounted separately in the corresponding casing parts during assembly and abut by their ends to form a complete shroud ring on assembly together of the casing parts. Each part-circular portion of the inner shroud ring may be divided into two on a transverse plane through the bearing sockets for the inner ends of the ring of adjustable stator blades to facilitate assembly of the blades in the shroud ring, and the two parts of each part-circular portion of the inner shroud ring will in such a case be secured together as by bolting after assembly of the stator blades.

According to yet another feature of this invention, those stator blades of the ring of adjustable stator blades which support the inner shroud ring may be formed from a material different from that of the remaining stator blades; for example the supporting stator blades may be formed from steel and the remaining stator blades may be made from an aluminium alloy.

According to yet another feature of this invention, the thrust bearings above referred to may be pre-loaded.

The number and location of the supporting stator blades may be varied as desired and conveniently they will be distributed substantially uniformly around the ring of blades.

The arrangement of this invention is especially suitable for supporting the inner shroud of a ring of adjustable stator blades located between two stages of rotating blading, since in this case the inner shroud ring cannot be readily supported from other stationary parts of the compressor or turbine structure.

A construction of axial-flow compressor will now be described which has between two stages of rotating blades a ring of stator blades, the angle of attack of which can be varied, for the purpose, for example, of preventing stalling of the compressor when running at a speed substantially different from its designed running speed, by turning the blades about their radial axes. The description makes reference to the accompanying drawings in which:

Figure 1 illustrates the axial-flow compressor with parts of the periphery broken away, Figure 2 is a section showing part of a ring of adjustable stator blades, Figures 3, 4, 5 are sections on the lines 3—3, 4—4, and 5—5 respectively of Figure 2, and Figure 6 is a section on the line 6—6 of Figure 3.

Referring to Figure 1, the casing of the axial-flow compressor comprises two substantially semi-cylindrical parts 10, 11 which in assembly are bolted together over flanges 12. The compressor comprises between two rings 13, 14 of rotor blades a ring of adjustable stator blades some of which are referenced 15a, and of which the remainder are referenced 15b.

Each of the adjustable blades 15a, 15b of the ring of guide blades is formed with an integral outer platform 16 from the outer surface of which projects a supporting spindle 17a, 17b respectively, the platforms 16 together forming the outer shroud ring of the ring of blades. Each blade 15a or 15b is also formed at its inner end with a stub spindle 18 by which the blade engages with an inner shroud ring 19 in a manner permitting it to rotate freely about its radial axis.

The inner shroud ring 19 for the ring of adjustable blades 15a, 15b is formed in two semicircular halves 19a, 19b which are respectively allocated to the two parts 10, 11 of the compressor casing. The end faces of one half 19b of the inner shroud ring are formed with projecting ribs 20 (Figure 2) which spigot into suitably shaped recesses 21 in the ends of the other half 19a of the shroud ring so as to locate the two halves accurately with respect to one another on assembly of the two parts 10, 11 of the compressor casing. The radial forces at the junction of the two halves, 19a, 19b, due to the resultants of the tangential loads on the stator blades, are thereby accommodated.

The inner shroud ring 19 is formed with a plurality of radial bores 22 which are enlarged at their radially outer ends, and the bores 22 receive the spindles 18 provided on the inner ends of the adjustable guide blades 15a, 15b. To facilitate assembly of the blades and their engagement in the radial bores 22, each half 19a, 19b of the inner shroud ring 19 is split on a transverse plane (see Figure 5) so that the parts of each half can be assembled to the inner ends of the blades after they have been placed in position in the appropriate part of the compressor casing and prior to assembly together of the two parts 10, 11 of the compressor casing. The parts of each half of the inner shroud ring 19 are secured together by bolts 23.

The adjustable blades associated with each part of the compressor casing are divided into two sets 15a, 15b of which the set of blades 15a have elongated spindles 17a on their outer platforms 16 and the set of blades 15b have plain cylindrical spindles 17b. In a ring of 67 adjustable blades, for example, 8 of the blades may be provided with elongated spindles 17a, four being allocated to each half of the compressor casing.

The blades 15a with elongated spindles 17a are so arranged within the outer casing of the compressor that their spindles project into radial recesses in bosses 24 (Figures 2 and 3) formed on the outer casing and the spindles 17a are located within the recesses lengthwise of the blades through two deep groove ball journal bearings 25, 26 which also act as thrust bearings. The inner races of bearings 25 fit on the spindles 17a adjacent the platform 16 on the blades 15a and the inner races of bearings 26 fit on the spindles 17a adjacent their free ends. The inner races of bearings 25, 26 may be pre-loaded towards one another in the direction of their axes by Thackeray washers 27. The blades 15a with elongated spindles 17a will be distributed substantially uniformly around the compressor casing. Covers 24a are provided for the outer ends of the bores in bosses 24.

The blades 15b having the stub spindles 17b at their outer ends are distributed in the spaces between the blades 15a having the elongated spindles 17a and the spindles 17b are engaged with the outer casing of the compressor through cylindrical bearing bushes 29 which are let into radial bores 30 in the wall of the outer casing. The bores in the bushes 29 extend only part way through the bushes.

From the foregoing description, it will be seen that of the ring of adjustable blades only the blades 15a with elongated spindles 17a have bearing arrangements 25, 26 which locate them against rocking motion and lengthwise movement within the outer casing and that these blades act like cantilevers to support the inner shroud ring 19 by the spindles 18 on the inner ends of blades 15a engaging with the bearing bores formed in the inner shroud ring 19. The remaining blades 15b of the ring of adjustable blades are supported in effect loosely between the inner shroud ring 19 and the outer casing 10, 11 of the compressor, and do not make any substantial contribution to the support of the shroud ring 19.

It is preferred that the blades 15a having elongated spindles 17a be made from a material such as steel and that the remaining blades 15b be made from a material such as aluminium alloy.

It will be appreciated that by suitably selecting the number and position of the blades 15a the inner shroud ring 19 may be located against radial and rotational movement. The additional weight of elongated spindles 17a and bearing means 25, 26 may thereby be avoided on the majority of blades.

The following arrangement is provided in the illustrated construction for adjusting the angle of attack of guide blades.

Referring to Figures 3, 4 and 6 each blade 15a, 15b is provided on its platform 16, on the side thereof remote from the blade, with a peg 30 which fits into a diametral bore in a solid cylindrical piece 31 which is received in an axially-directed part-cylindrical recess 32, formed in the inner surface of an operating ring 33 mounted within a groove in a thickened part 34 of the compressor casing so as to rotate about the axis of the compressor. When the ring 33 is rotated it constrains the peg 30 on each of the adjustable blades 15a, 15b to be displaced in a direction circumferentially of the compressor casing 10, 11, thus rotating the blades about their radial axes. The cylindrical pieces 31 above referred to swivel on the operating pegs and also slide in the axial part-cylindrical recesses 32 in which they are received. As will be seen from Figure 6, the ring 33 is made in two halves having recesses 35 in their abutting ends to receive springs 36 for transmitting movement of one half to the other.

The operating ring 33 is arranged to be given a limited rotation about the compressor axis from outside the compressor by one of the spindles 17a being extended through its associated cover plate 24a (Figure 1) and being provided at its outer end with an operating lever 40 connected with a suitable control, illustrated as a ram 41.

The operating ring 33 is located both axially and radially within the groove in the compressor casing by rollers 42 mounted on axial pins 43 supported in plug-like inserts 44 attached to the compressor casing. These plug-like inserts 44 are conveniently of cylindrical form having slots to accommodate the rollers 42, certain of which may be larger than the remainder. The larger rollers 42 are arranged to co-operate with local radially and circumferentially extending grooves 45 formed in the outer surfaces of the operating ring 33, thereby to provide radial and axial location of the ring, while the smaller rollers (not shown) run on the outer peripheral surface of the ring 33 and provide radial location therefor.

The bearing bushes 29 for the stub spindles 17b, and the rollers 42 for locating the operating ring 33 are conveniently formed from a material having a low coefficient of friction when not supplied with lubricant from an external source.

The stub spindles 17b and the spindles 18 are preferably relieved over part of their length, for example by giving them a slight taper, to allow a small rocking movement of the spindles in their sockets or bores.

The platforms 16 of the adjustable blades are preferably received in suitably shaped recesses in the casing so that their radially inner surfaces form a smooth continuation of the adjacent parts of the compressor annulus, and the recesses receiving the platforms and the axially-spaced ends of the platforms are curved about the radial axis of the associated blade to permit the platform to swing with the blade. A small clearance is provided between adjacent platforms for the same purpose.

I claim:

1. In an axial-flow fluid machine a stator structure comprising a plurality of stator blades and means to support said stator blades in circumferentially spaced relation, comprising an annular outer casing structure, each blade having at its outer end a radially-extending spindle, the radial extent of some of the spindles being greater than that of the remaining spindles, a plurality of circumferentially-spaced journal thrust bearings supported in the outer casing structure with their axes radial, there being one such journal thrust bearing for each of the spindles having the greater radial extent to support the associated spindle rotatively in the outer casing structure, a plurality of simple journal bearings arranged in said outer casing structure with their axes radial, there being one such simple bearing for each of said remaining spindles to position the associated spindle circumferentially in the outer casing structure, and a radial spindle at the inner end of each of said blades, an annular inner shroud structure having therein a plurality of bearings with their axes radial, there being one bearing for each of said spindles at the inner ends of the blades to be engaged rotatively thereby.

2. A stator structure as claimed in claim 1, having each said journal thrust bearing comprising a pair of ball thrust bearings mounted on the associated spindle at locations spaced apart lengthwise of the spindle.

3. A stator structure as claimed in claim 1, having each said simple journal bearing comprising a bush having a cylindrical bore therein to be engaged by the associated spindle.

4. A stator structure as claimed in claim 1, having said inner shroud structure comprising a ring with a plurality of circumferentially-spaced radial bores, there being a bore to afford each of said bearings for said radial spindles at the inner ends of the stator blades.

5. A stator structure as claimed in claim 1, having said inner shroud structure comprising a ring with a plurality of circumferentially-spaced radial bores, there being a bore to afford each of said bearings for said radial spindles at the inner ends of the stator blades, said ring being formed in abutting parts whereof the plane of abutment extends through each of the bores so that each ring part has formed in it a plurality of half bores.

6. In an axial-flow fluid machine having a stator structure formed in a number of segments arranged together to form a complete annulus of stator blading, a construction of said segments comprising a plurality of circumferentially-spaced stator blades, and a part-annular inner shroud structure and a part-annular outer casing structure, said blades being supported in said inner shroud structure and said outer casing structure in circumferentially-spaced relation, each said blade being rotatively adjustable about its lengthwise axis by each blade having at its outer end a radially-extending spindle, the radial extent of some of the spindles being greater than that of the remaining spindles, a plurality of journal thrust bearings, one for each of said spindles having the greater radial extent to support the associated spindle rotatively in the outer casing structure with the spindle axis radial to the axis of the outer casing structure, a plurality of simple journal bearings, one for each of said remaining spindles to position the associated spindle circumferentially in the outer casing structure with the spindle axis radial to the axis of the outer casing structure, and a radial spindle at the inner end of each of said blades, said spindles at the inner ends of the blades being engaged rotatively in the inner shroud structure with their axes radial to the axis of the inner shroud structure.

7. In an axial-flow fluid machine, a stator casing, a rotor rotatively mounted in said stator casing, a plurality of axially-spaced rows of rotor blades mounted on the periphery of said rotor to rotate therewith, a row of stator blades mounted in said stator casing between a pair of said rows of rotor blades, each stator blade of said row having at each of its ends a longitudinally-extending spindle, the spindle at one end being aligned with the spindle at the other end, a plurality of outer bearings provided in circumferentially-spaced relation in said stator casing, there being an outer bearing for each blade of said row of stator blades and each outer bearing having its axis radial to the machine axis, and an annular inner shroud structure encircling said rotor between said two rows of rotor blades, a plurality of inner bearings provided in circumferentially-spaced relation in said inner shroud structure, there being one inner bearing for each blade of said row of stator blades and each inner bearing having its axis radial, each blade of the row of stator blades having the spindle at one of its ends rotatively engaging an outer bearing and the spindle at the other of its ends rotatively engaging an inner bearing, whereby said inner shroud structure is supported from and maintained concentric with said stator casing solely by said row of stator blades.

8. A stator structure as claimed in claim 7, having said inner shroud structure comprising a ring with a plurality of circumferentially-spaced radial bores, there being a bore for each of the radial spindles at the inner ends of the stator blades, said ring being formed in abutting parts whereof the plane of abutment extends through each of the bores, so that each ring part has formed in it a plurality of half bores.

FREDERICK WILLIAM WALTON MORLEY.

References Cited in the file of this patent

UNITED STATES PATENTS

| Number | Name | Date |
|---|---|---|
| 1,680,737 | Hodgkinson | Aug. 14, 1928 |
| 2,443,263 | Meyer | June 15, 1948 |
| 2,455,251 | Hersey | Nov. 30, 1948 |
| 2,460,778 | Willgoos | Feb. 1, 1949 |
| 2,472,062 | Boestad | June 7, 1949 |
| 2,473,329 | Candler | June 14, 1949 |
| 2,488,875 | Morley | Nov. 22, 1949 |
| 2,500,070 | Hagen | Mar. 7, 1950 |

FOREIGN PATENTS

| Number | Country | Date |
|---|---|---|
| 579,585 | Germany | July 1, 1933 |
| 629,770 | Great Britain | Sept. 28, 1949 |
| 823,441 | France | Oct. 18, 1937 |
| 970,723 | France | June 21, 1950 |